(12) United States Patent
Minano et al.

(10) Patent No.: US 7,144,121 B2
(45) Date of Patent: Dec. 5, 2006

(54) DICHROIC BEAM COMBINER UTILIZING BLUE LED WITH GREEN PHOSPHOR

(75) Inventors: Juan Carlos Minano, Madrid (ES); Pablo Benitez, Madrid (ES); William A Parkyn, Jr., Lomita, CA (US)

(73) Assignee: Light Prescriptions Innovators, LLC, Altadena, CA (US)

( * ) Notice: Subject to any disclaimer, the term of this patent is extended or adjusted under 35 U.S.C. 154(b) by 0 days.

(21) Appl. No.: 10/987,182

(22) Filed: Nov. 12, 2004

(65) Prior Publication Data

US 2005/0117125 A1    Jun. 2, 2005

Related U.S. Application Data

(60) Provisional application No. 60/520,513, filed on Nov. 14, 2003.

(51) Int. Cl.
*G02B 27/10*    (2006.01)

(52) U.S. Cl. .................. 353/94; 362/231; 362/800; 359/634

(58) Field of Classification Search .................. 353/30, 353/31, 33, 38, 94, 81; 349/69, 70, 71; 359/634, 638, 639, 640; 362/84, 231, 230, 362/234, 800
See application file for complete search history.

(56) References Cited

U.S. PATENT DOCUMENTS

| | | | |
|---|---|---|---|
| 5,343,330 A | | 8/1994 | Hoffman et al. |
| 5,438,453 A | * | 8/1995 | Kuga ......................... 359/636 |
| 5,453,877 A | | 9/1995 | Gerbe et al. |
| 5,580,142 A | * | 12/1996 | Kurematsu et al. ........... 353/31 |
| 5,600,487 A | * | 2/1997 | Kiyomoto et al. .......... 359/634 |
| 5,699,186 A | | 12/1997 | Richard |
| 6,097,549 A | | 8/2000 | Jenkins et al. |
| 6,139,166 A | * | 10/2000 | Marshall et al. ............ 362/231 |
| 6,252,636 B1 | * | 6/2001 | Bartlett ....................... 348/743 |
| 6,547,400 B1 | * | 4/2003 | Yokoyama ................... 353/98 |
| 6,554,455 B1 | | 4/2003 | Perlo et al. |
| 6,641,287 B1 | | 11/2003 | Suehiro |
| 6,692,136 B1 | * | 2/2004 | Marshall et al. ............ 362/231 |
| 6,729,746 B1 | | 5/2004 | Suehiro et al. |
| 6,769,772 B1 | * | 8/2004 | Roddy et al. ................. 353/31 |
| 6,830,359 B1 | | 12/2004 | Fleury |
| 6,848,820 B1 | | 2/2005 | Natsume |
| 6,863,402 B1 | * | 3/2005 | Roddy et al. ................. 353/31 |
| 6,882,379 B1 | * | 4/2005 | Yokoyama et al. .......... 349/61 |
| 6,886,962 B1 | | 5/2005 | Suehiro |
| 6,926,435 B1 | | 8/2005 | Li |

(Continued)

OTHER PUBLICATIONS

Georg Glaeser, et al., "Reflections on Refraction" AMS, Sep. 5, 2001, pp. 1-18.

(Continued)

*Primary Examiner*—William C. Dowling
(74) *Attorney, Agent, or Firm*—Thomas F. Lebens; Sinsheimer Juhnke Lebens & McIvor

(57) ABSTRACT

A white beam with high color-rendering index is formed by uniting a collimated red beam and a collimated blue-green beam, the latter having as its source a blue LED with a green phosphor. The white beam is formed by a prism with an amber low-pass dichroic filter. The prism cross-section can be either a square or an equilateral triangle. The triangular prism can have one third of its mass reduced by stepped facets. Both types of prism can be elongated to accommodate multiple collimators. Switching between white, red, and blue-green allows application to police vehicles.

7 Claims, 5 Drawing Sheets

U.S. PATENT DOCUMENTS

| | | |
|---|---|---|
| 6,948,836 B1 | 9/2005 | Ishida et al. |
| 6,953,265 B1 | 10/2005 | Suehiro et al. |
| 6,997,587 B1 | 2/2006 | Albou |
| 2004/0125614 A1 | 7/2004 | Ishida et al. |
| 2004/0190304 A1 | 9/2004 | Sugimoto et al. |
| 2005/0135095 A1* | 6/2005 | Geissler ............ 362/231 |
| 2005/0200812 A1* | 9/2005 | Sakata et al. ............ 353/20 |
| 2005/0219464 A1* | 10/2005 | Yamasaki et al. ............ 353/20 |

OTHER PUBLICATIONS

International Search Report and Written Opinion, PCT/US2004/038162, mailed Nov. 30, 2005.

* cited by examiner

DICHROIC BEAM COMBINER UTILIZING BLUE LED WITH GREEN PHOSPHOR

This application claims priority under 35 U.S.C. 119(e) to U.S. Provisional Patent Application No. 60/520,513 filed Nov. 14, 2003, of Minano, et. al., for DICHROIC BEAM COMBINER UTILIZING BLUE LED WITH GREEN PHOSPHOR, which U.S. Provisional Patent Application is hereby fully incorporated herein by reference.

BACKGROUND OF THE INVENTION

One the several ways of using light-emitting diodes (LEDs) to make white light is separately generating three differently colored wavebands and subsequently combining them. This has the advantage of each color source being separately cooled, so that the combined luminous output of the three LEDs is potentially higher than that of one. One example of a single LED producing white light is a blue LED coated with a yellow phosphor, such as those produced by Lumileds and by Nichia.

Dichroic beam combining systems are found in television, particularly those utilizing dichroic prisms and even crossed dichroic prisms, containing two dichroic mirrors. These systems, however, typically involve mixing the light of three different colors. In the case of machine vision, particularly for such tasks as fruit sorting, it would be three spectral-waveband channels.

Illumination systems utilizing dichroic mirrors can be found in commercially available lamps such as the MR series with built-in dichroic-coated glass reflectors, called cold reflectors because they do not put heat into the light beam. Dichroic reflectors are also utilized as hot mirrors, which return longer wavelengths to a source in order to boost its shorter-wavelength emissions.

The present invention, in contrast, utilizes a dichroic prism for combining only two wavebands in the generation of white light. This is a more suitable function of a dichroic reflector, which is a nearly lossless cutoff filter designed for 45° incidence. It thereby divides white light into longer wavelengths, which are transmitted, and the shorter wavelengths, which are reflected. Thus a dichroic reflector for beam combining could be made for any wavelength that suitably divides the visible spectrum. The cutoff wavelength can be chosen according to the thickness and composition of the component layers of the coating. Because the exact cutoff wavelength of a dichroic coating is somewhat angle sensitive, it is best for the beam-combining function if neither beam contained wavelengths very near the cutoff.

When using two colors to produce a white combination, it is only necessary that each component's location on the chromaticity diagram be opposite the other from a white center point, and that the two beams have the proper relative fluxes that balance to that white. This will suffice for such direct-view functions as a white-light navigation beacon or accent lighting. For illumination, however, two wavelengths give poor color rendition, making it difficult to distinguish red vs. green objects, in the case of a yellow-blue pair of LEDs combined by a green dichroic reflector, or green vs. magenta objects, in the case of a red-cyan pair combined by an amber dichroic reflector. In the latter case of an amber reflector, good color rendition would require the prior art of LED-beam combining to use blue and green LEDs with a cyan dichroic filter.

The color-rendition problem of a single dichroic filter is solved by the present invention by a novel component of the present invention, a blue LED with a green phosphor. Conventional white LEDs, such as those by Nichia or Lumileds, utilized blue LED chips coated with a yellow phosphor, to produce white outputs with good color rendition. Such LEDs will soon be applied to automobile headlamps, but their peak luminance sets the peak candlepower limit for a given headlamp size.

Instead, the blue LED with green phosphor of the present invention has its light efficiently collected and collimated, thence to be combined with a similarly collimated red beam, by an amber dichroic prism. A novel alternative is disclosed to the 45° prisms of the prior art.

SUMMARY OF THE INVENTION

The present invention relates generally to the production of superior levels of luminance by dichroicly combining a collimated red beam with the collimated beam of a blue LED with a green phosphor. Dichroic prisms of the prior art form a cube consisting of a pair of 45° prisms joined hypotenuse-to-hypotenuse on either side of a dichroicly reflective interface, preferably a dielectric stack of quarter-wave layers. The two collimated light sources are located on different faces of the cube and lie 90° to each other. Disclosed herein is a novel configuration comprising an equilateral-triangle prism with the two collimated light sources adjacently positioned. These two collimated sources can be advantageously mounted on the same circuit board, so that their output beams enter the beam-combining prism in parallel.

The green phosphor of the present invention operates near the 555 nm wavelength of peak luminous efficacy (683 lumens/watt). It necessarily produces more lumens than a yellow phosphor of the same quantum efficiency. A green phosphor coating on a high-power blue LED can be given the requisite thickness for proper color balance with a high-power red LED. The present invention advantageously combines these two wavebands into a white resultant with high color-rendering index as well as higher luminance than possible solely with a white LED based on the same blue chip. This superior performance is because of the higher luminance of a blue LED with green phosphor being efficiently combined with the additional luminance of a red LED with separate cooling means. The linear nature of the prism allows long arrays of such red-blue LED pairs to be utilized for very powerful vehicular lighting. In the case of police vehicles, switching off either set of LEDs would produce either a red or a cyan light, the latter being close to the conventional blue of police emergency lights. Such a long prism is easily swiveled to vertically steer the high-intensity output beam.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

A better understanding of the features and advantages of the present invention will be obtained by reference to the following detailed description of the invention and accompanying drawings, which set forth illustrative embodiments in which the principles of the invention are utilized.

The following description of the presently contemplated best mode of practicing the invention is not to be taken in a limiting sense, but is made merely for the purpose of describing the general principles of the invention. The scope of the invention should be determined with reference to the claims.

Figure 1:
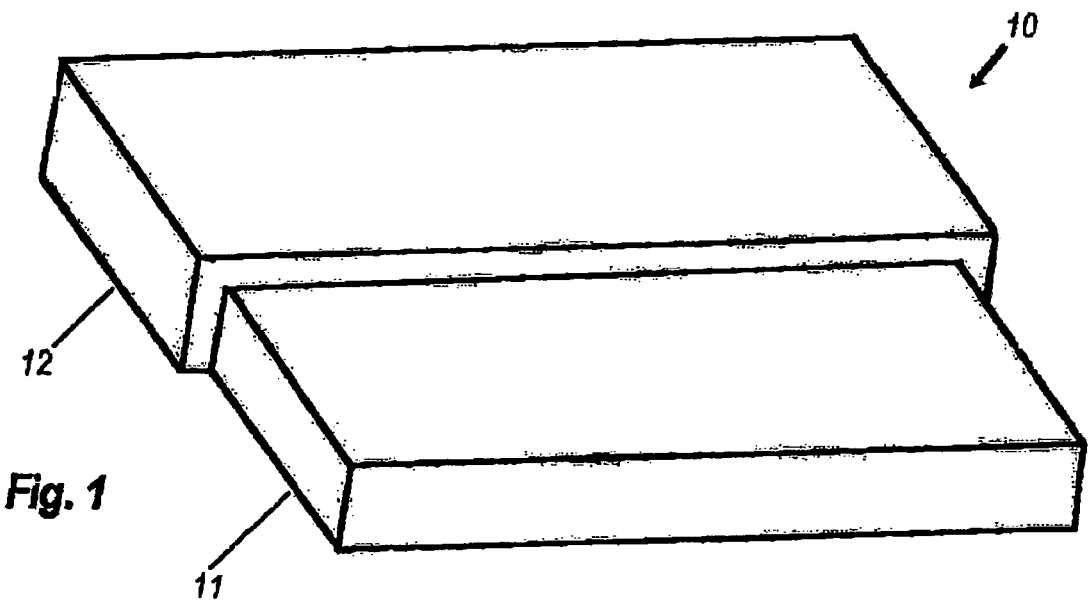
FIG. 1 depicts an exemplary configuration of a green phosphor coating on a blue LED chip.

FIG. 1 schematically depicts coated LED 10 comprising blue LED 11 and green phosphor coating 12.

Figure 2:
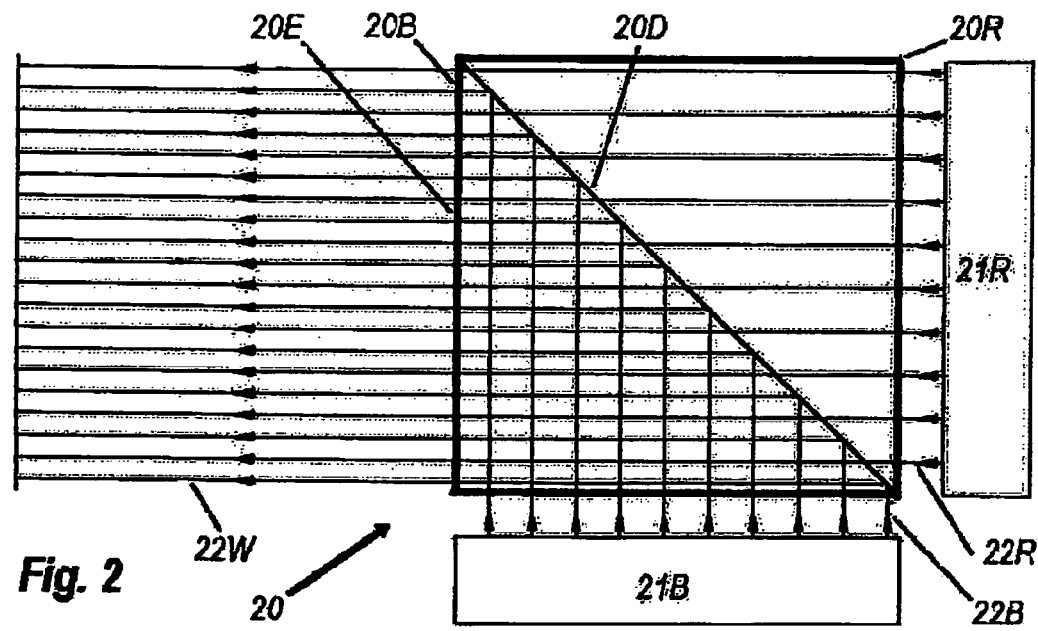
FIG. 2 depicts a preferred embodiment utilizing a square dichroic prism.

FIG. 2 depicts prism 20 comprising isosceles half-square prism 20B and congruent prism 20R, both joined along dichroic interface 20D. Collimator 21R emits substantially parallel red rays 22R, which pass with high transmittance through filter 20D, thereafter to exit prism 20 via exit face 20E. Orthogonally oriented collimator 21B emits substantially parallel blue-green beam 22B, which is deflected 90° with high reflectivity by filter 20D, joining red rays 22R to exit prism 20 via exit face 20R. The two conjoined beams 22R and 22B produce white beam 22W, having good color rendition because beam 22B has both green and blue wavelengths.

Figure 3:
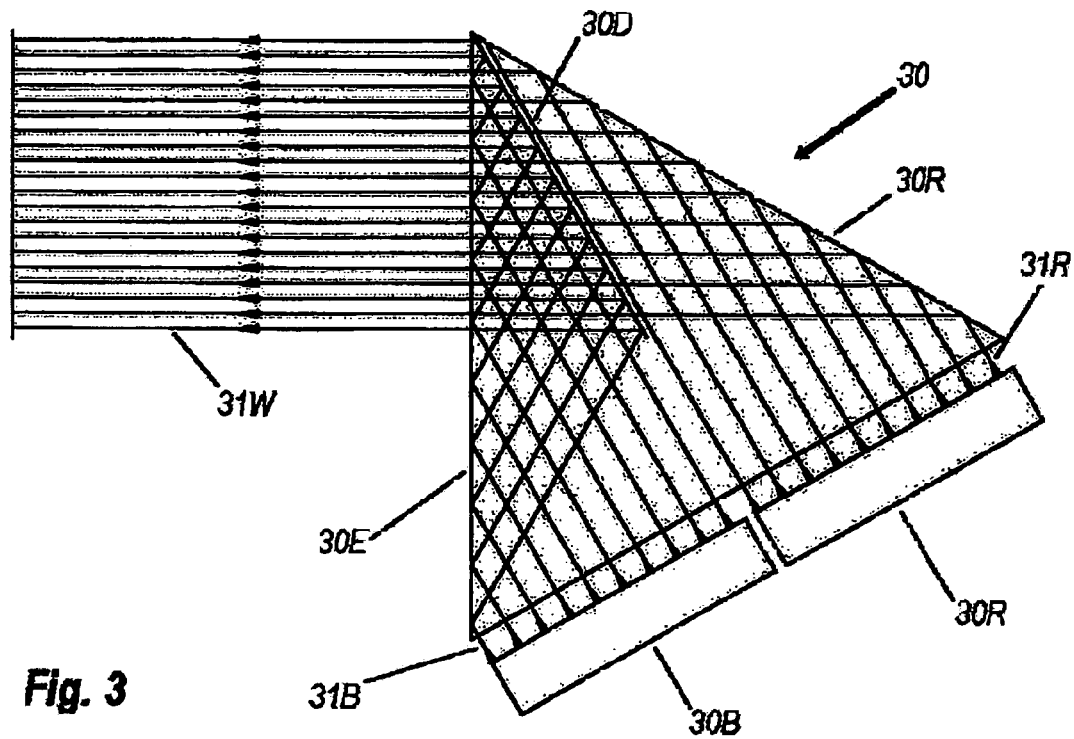
FIG. 3 depicts a preferred embodiment utilizing a triangular prism.

FIG. 3 depicts equilateral triangular prism 30 with interior dichroic mirror 30D. Collimator 30R emits substantially parallel red rays 31R, which are internally reflected off prism face 30R, thence passing with high transmittance through filter 30D. Collimator 30B emits substantially parallel blue rays 31B, which are internally reflected off prism exit face 30E, thence deflected with high reflectivity by dichroic filter 30D. The combined rays pass through exit face 30E to become white beam 31W.

Figure 4:
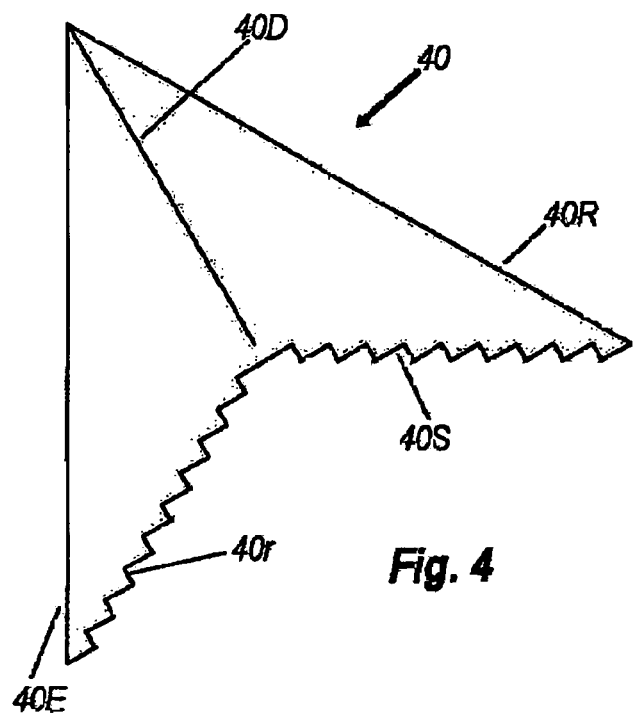
FIG. 4 depicts a triangular prism with material advantageously removed by substituting stepped facets for the flat input face.

FIG. 4 depicts a lightened version of this design, dichroic prism 40. Steps 40S reduce the mass of prism 40, but at the cost of losing the few rays striking the riser steps 40r. Rear face 40R, dichroic filter 40D, and exit face 40E are analogous to those in FIG. 3.

Figure 5:
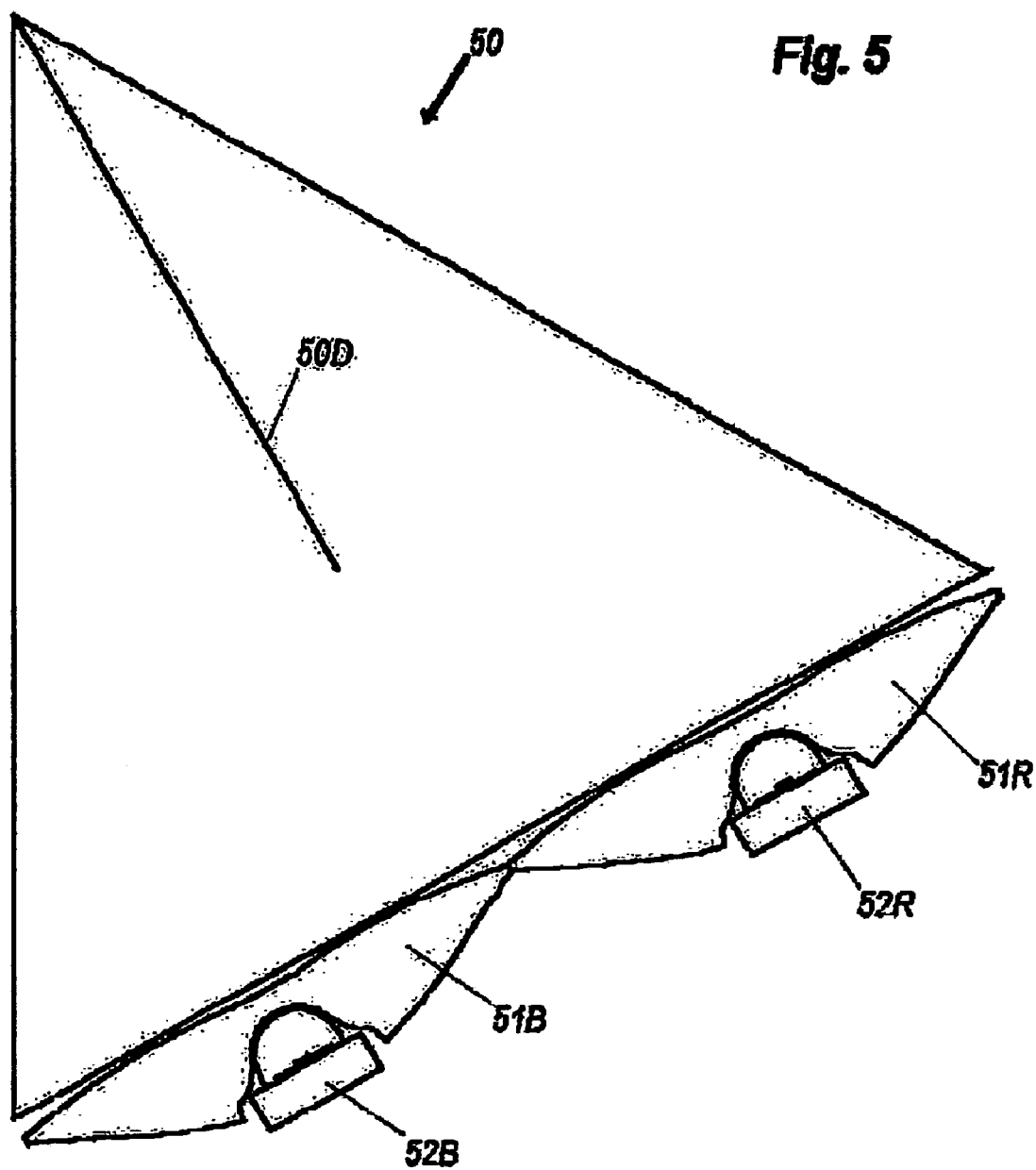
FIG. 5 shows a triangular prism with RXI collimators.

FIG. 5 depicts the use of RXI lenses as collimators. Triangular beam-combining prism 50 comprises interior dichroic mirror 50D. Blue RXI lens 51B focuses on blue LED 52B. Red RXI lens 51R focuses on red LED 52R.

Figure 6:
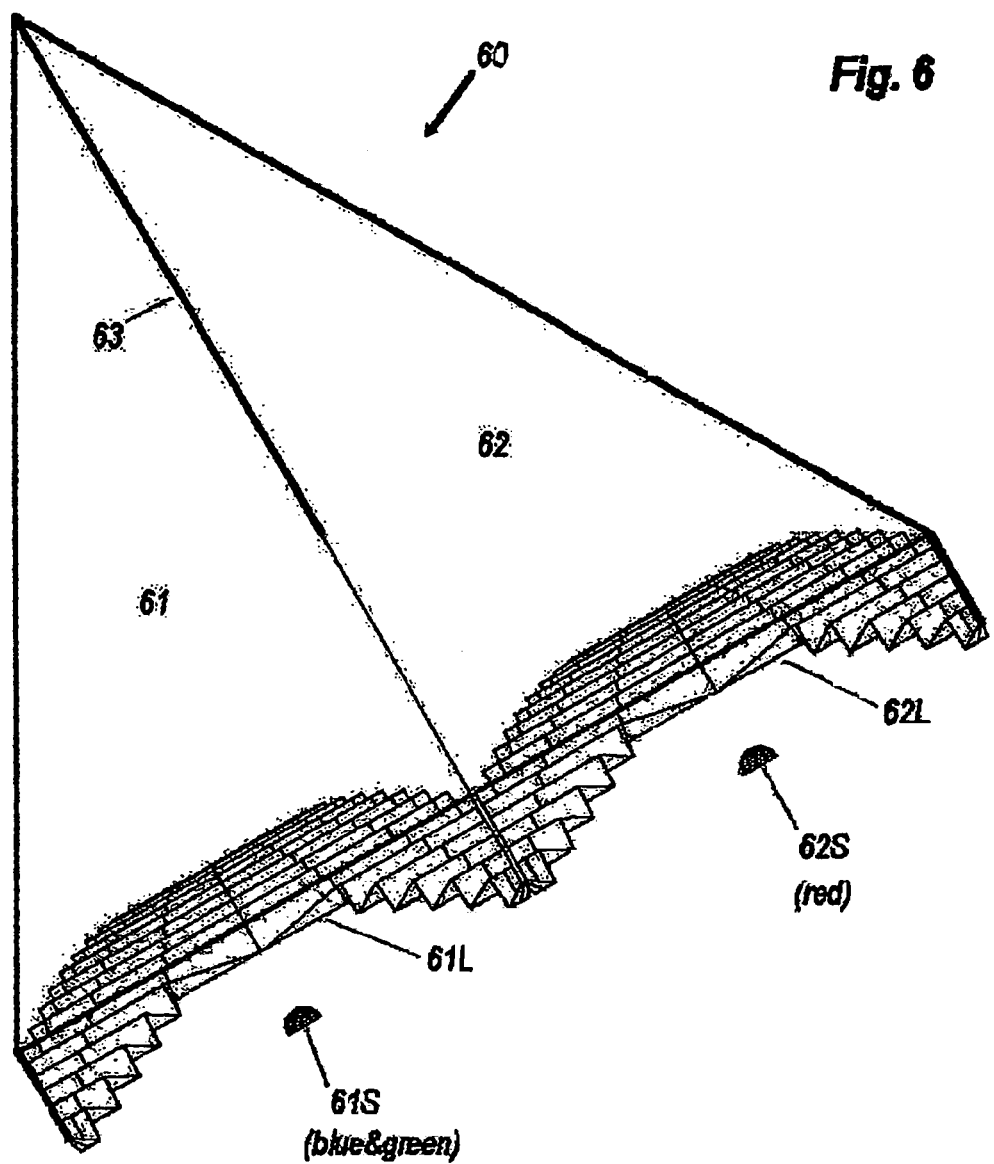
FIG. 6 shows a triangular prism with TIR-lens collimators.
Figure 6A:
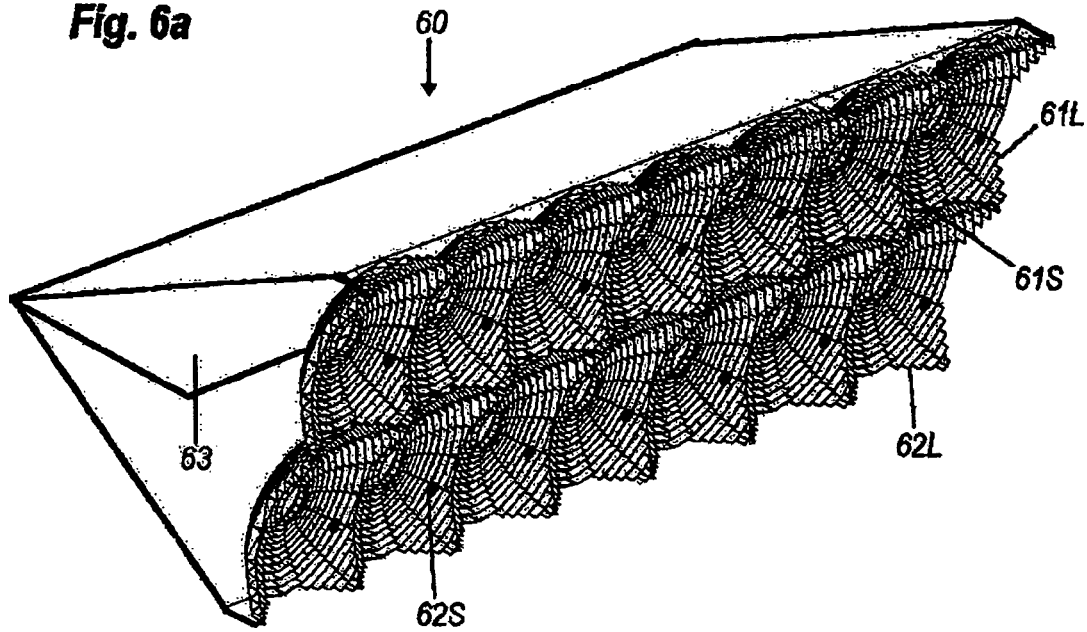
FIG. 6A is a perspective view of a beam-combining prism with a tiled multiplicity of square-cut collimators.

FIG. 6 depicts the use of TIR lenses as collimators. Beam combining prism 60 comprises two identical half-prisms 61 and 62, joined at dichroic coating 63. Blue half-prism 61 includes on its lower surface TIR lens 61L, which is focused on blue & green source 61S. Red half-prism 62 has on its lower surface TIR lens 62L, focused on red source 62S. FIG. 6A is a perspective view of beam-combining prism 60, showing dichroic coating 63, TIR lenses 61L and 62L, blue & green sources 61S and red sources 62S.

Figure 7:
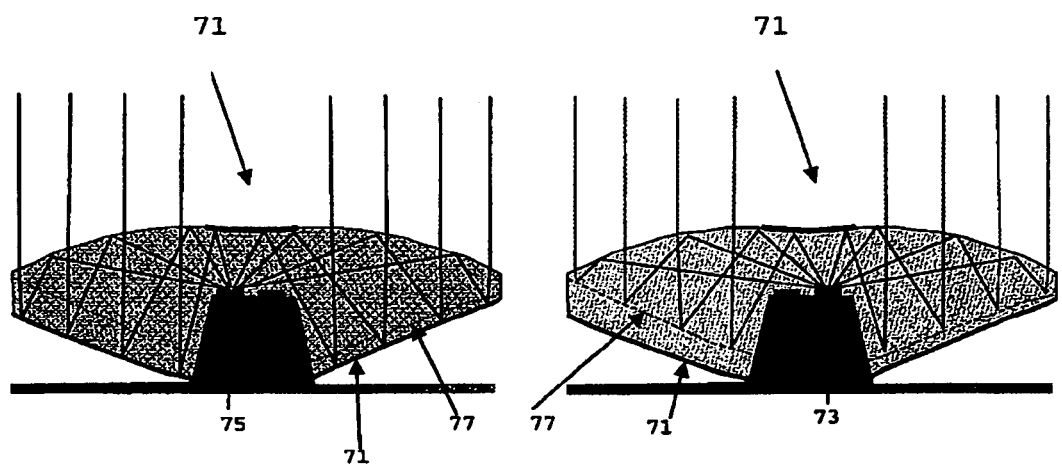
FIG. 7 is a side cross sectional view of an RXI collimator with spectrum merging based on an integrated dichroic mirror.

Referring next to FIG. 7, shown are two side cross sectional views of an RXI collimator 71 with spectrum merging based on an integrated dichroic mirror according to the present invention.

Shown is a modified RXI 71 containing two LEDs 73, 75 (one of high bandgap (blue+green) 73 and another one of low bandgap energy (red) 75), and a dichroic mirror 77.

The spectrum merging RXI is formed by, at least, 3 optical surfaces: two of them are the surfaces of a conventional RXI designed for a single emitter, which can be one of the two emitters 73, 75. This emitter is the red LED 75 in the example of FIG. 7. The third optical surface is the dichroic mirror. 77 which, in the example of FIG. 7 reflects the short wavelengths and let pass the long wavelengths. The dichroic mirror 77 is transparent for the low energy photons, which are emitted by the low band-gap LED 75, while said layer 77 is a mirror for the high energy photons, which are emitted by the high band gap cell 73.

This dichroic mirror 77 is designed as follows: First trace the red rays emanating from a central point of the red emitter until the RXI aperture. Calculate a wavefront $W_o'$ of these rays once they have exited the RXI aperture. Calculate the wavefront $W_i$ obtained when a set of blue rays emanating from a central point of the blue LED are reflected by the RXI aperture surface. Calculate the wavefront $W_o$ such that when $W_o$ is refracted at the RXI aperture it becomes the wavefront $W_o'$. Calculate the dichroic mirror profile as the Cartesian oval reflector that couples the wavefronts $W_i$ and $W_o'$. There is only 1 degree of freedom in calculating the dichroic mirror: This is the optical path length from the wavefront $W_i$ to the wavefront $W_o'$. This optical path length is chosen so the dicroich mirror 77 does not intersect any of the 2 other optical surfaces and the resulting dichroic surface is inside the RXI.

The dichroic mirror 77 can be made as an interferential filter: by vacuum evaporation of its components or with the GBO technology of 3M. This last technology provides polymer sheets which can be vacuum molded if the deformation is not too big. This feature is particularly interesting for this invention. The most important advantage of the integrated dichroic mirror 77 is volume saving when compared to the other solutions. The dichroic mirror 77 must be, in general, a non flat surface (more expensive) and the rays are not as collimated as they are in the non integrated case when they reach the dichroic mirror. This means that the dichoric mirror 77 must keep its wavelength selective characteristics for a wider range of incidence angles (the importance of this effect depends on the particular application).

What is claimed is:

1. A white-beam combining system comprising a dichroic prism, a source of red collimated light, and a source of blue-green collimated light, said red collimated light source and said blue-green collimated light source being situated so as to enter the prism and be combined therein into a common output beam, wherein said prism has an equilateral triangle as cross-section and comprises an internal dichroic coating deployed on a plane connecting one vertex of said triangle with its centroid and further comprises adjacent red and blue-green collimators positioned to input their beams into said prism in a direction parallel to the plane of said coating.

2. The system of claim 1 wherein said prism has stepped facets facing said adjacent collimators and extending inward to said coating.

3. The system of claim 1 wherein said source of blue-green collimated light comprises a blue LED with a green-phosphor coating with color-balanced thickness.

4. A white-beam combining system comprising a dichroic prism, a source of red collimated light, and a source of blue-green collimated light, said red collimated light source and said blue-green collimated light source being situated so as to enter the prism and be combined therein into a common output beam,
   wherein the source of red collimated light includes a first collimator,
   wherein the source of blue-green collimated light includes a second collimator, and
   wherein each of the first and second collimators is an RXI lens.

5. A white-beam combining system comprising a dichroic prism, a source of red collimated light, and a source of blue-green collimated light, said red collimated light source and said blue-green collimated light source being situated so as to enter the prism and be combined therein into a common output beam,
   wherein the source of red collimated light includes a first collimator,
   wherein the source of blue-green collimated light includes a second collimator, and
   wherein each of the first and second collimators is a TIR lens.

6. The system of claim 1 wherein said prism extends orthogonally to its cross-section to accommodate a plurality of additional collimators.

7. The system of claim 1 further comprising means for enabling the common output beam to cycle between white, red, and blue-green.

* * * * *